March 21, 1967   G. YGFORS   3,310,100
STAND FOR AN ELECTRICAL SOLDERING IRON WITH
ADJUSTABLE HEAT EXCHANGE MEANS
Filed Nov. 19, 1964   2 Sheets-Sheet 2
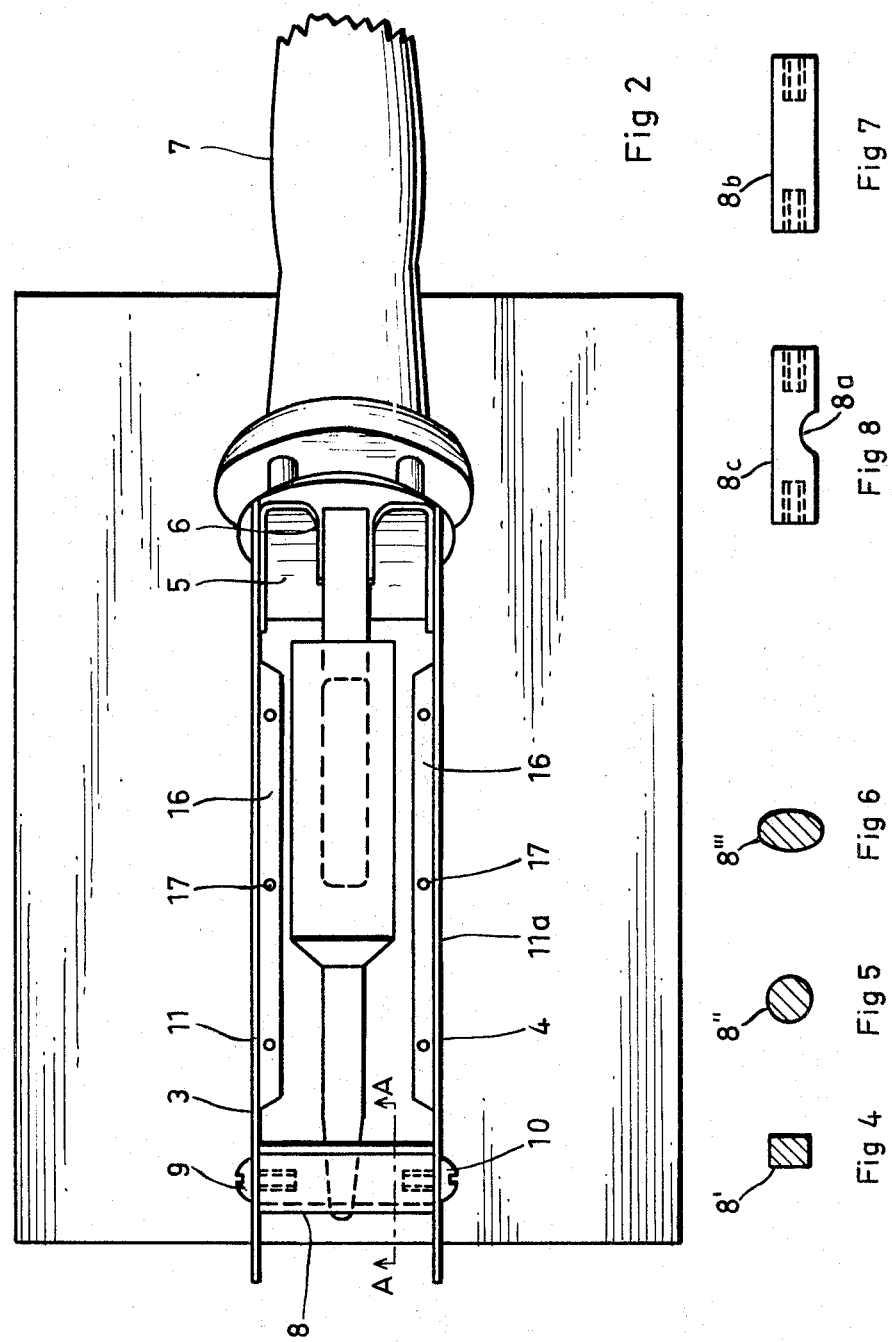

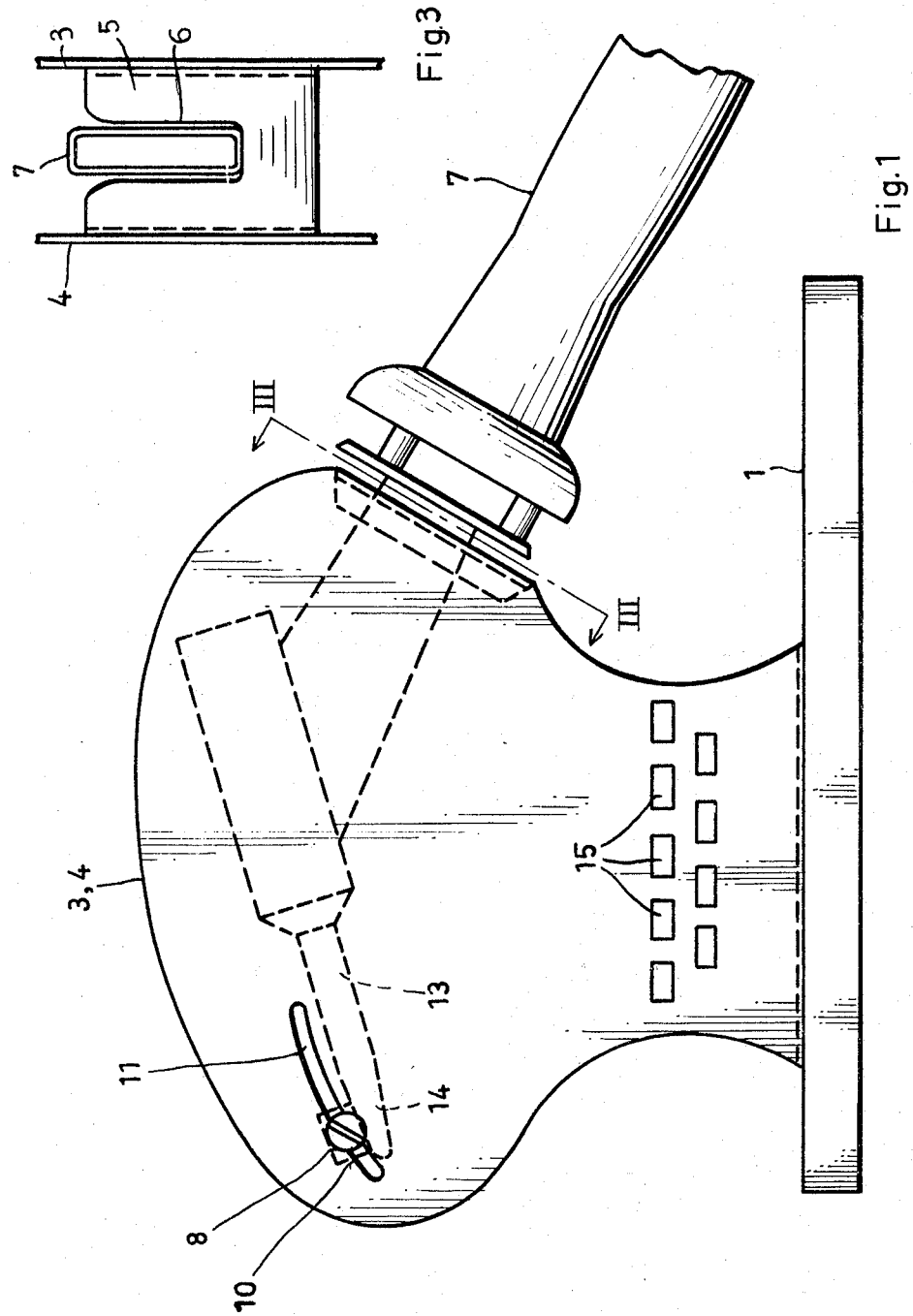

United States Patent Office

3,310,100
Patented Mar. 21, 1967

3,310,100
STAND FOR AN ELECTRICAL SOLDERING IRON WITH ADJUSTABLE HEAT EXCHANGE MEANS
Göran Ygfors, Studievagen 15, Sollentuna, Sweden
Filed Nov. 19, 1964, Ser. No. 412,417
Claims priority, application Sweden, Nov. 29, 1963, 13,279/63
8 Claims. (Cl. 165—80)

The present invention relates to a stand for electrical soldering irons, said stand having a frame, said frame comprising rear supporting means, said rear supporting means being arranged to support said soldering iron from beneath when the soldering iron is placed in said stand with its longitudinal axis in a horizontal direction, or somewhat inclined to the horizontal direction, said rear supporting means being further arranged to support said soldering iron between its weight centre and the soldering tip; said frame further comprising front supporting means, said front supporting means being arranged to support said soldering iron from above near its soldering tip, wherein said front supporting means is displaceable in said stand, in the longitudinal direction of said soldering iron.

A stand for a soldering iron according to the invention enables the soldering iron, while supported in the stand, to be kept at a temperature which is suitable for soldering but which is not sufficiently high to damage the soldering iron if it is supported for a long time.

In the following, the invention will be described more in detail, reference being had to the accompanying drawings, in which:

FIG. 1 is a side elevation of a stand according to the invention,

FIG. 2 is a top view of the same stand,

FIG. 3 is a detailed view of the stand along the line III—III in FIG. 1, as viewed in the direction of the arrows, FIGS. 4, 5 and 6 are cross sections along the line A—A in FIG. 2, as viewed in the direction of the arrows, and representing different embodiments of the invention, FIG. 7 is a detail view of one of the supporting means in a stand according to the invention, and FIG. 8 is a corresponding detail view representing another embodiment of the invention.

In the drawings, 1 designates a bottom plate of, for example, sheet iron, asbestos cement or the like. On the bottom plate 1 there are mounted two side plates 3 and 4 of sheet iron or the like. At the rear part of the stand side plates are connected to each other by means of an end plate 5. The end plate 5 may be integral with the side plates 3 and 4 or it may constitute a separate piece which is fastened to the side plates by screws or rivets, or by welding or the like.

In the end plate 5 there is a rectangular recess 6 intended to receive the shaft of a soldering iron of, for example, such a type which has a circular handle portion and a rectangular front shaft portion; the heating element and the soldering point being fastened to said rectangular shaft portion.

In FIG. 1, said soldering iron has the reference character 7.

At the front part of the stand (to the left in FIG. 1), there is a front support 8 supported between said side plates 3, 4. Said front support 8 is fastened to said side plates by means of screws 9 and 10, which are threaded in the ends of the support 8 and which penetrates the side plates 3, 4 in elongated slots 11. By this means, the support 8 is adjustable to different positions as far as said elongated slots permit.

The stand according to the invention is intended to receive a soldering iron and to support the latter in the manner illustrated in FIG. 1. The soldering iron rests with its rectangular shaft part 12 in the rear support 5. The soldering point 13 with its tip 14 abuts from beneath against the front support 8. The front support 8 conducts heat away from the soldering point 13 so that the latter will not be over-heated and subject to damages. The strength of said heat conduction may be adjusted to a suitable value by adjusting said support 8 to a suitable position in the slots 11. If the support 8 is positioned to abut against the soldering point near to the heating element, the heat conduction will be stronger than it would be if the support 8 is positioned to cooperate with the soldering point near to its soldering tip.

The heat conduction may also be affected by shaping the support 8 in different ways.

In FIGS. 4, 5 and 6 there are illustrated three different embodiments of the support 8. According to FIG. 4 the support 8' has a rectanglar cross section. A support of that shape may be adjusted to abut against the soldering point either with the long side or with the short side of its cross section. In the first mentioned case the heat conduction will be stronger than in the last mentioned case. In the embodiment according to FIG. 5 the front support 8" has a circular cross section. In the embodiment according to FIG. 6 the cross section is elliptical. In this embodiment 8''', as in the embodiment according to FIG. 4, it is possible to adjust the heat conducting properties of the support by turning it to different angular positions.

The support 8 may also have the shape of a straight plate or a straight rod 8b which is illustrated in FIG. 7. The support 8c may, however, be provided with a recess 8a, as illustrated in FIG. 8. The recess 8a encircles the point of the soldering iron along a great part of its circumference. In this case a rather strong conduction of heat away from the soldering iron is obtained.

A plurality of other embodiments of said front support 8 may be provided without departing from the scope of the present invention.

The heat which is conducted from the soldering iron by the front supporting means 8 is conducted to the side plates 3, 4 and radiated from the latter. The side plates serve as heat radiating flanges.

The support 8 as well as the side plates 3, 4 may be made from iron or from a metal with better heat conductivity than iron, for example aluminium or copper.

The rear support 5 serves also as a heat shield between the heating element and the handle of the soldering iron. Due to this shield, the handle will be kept at a low temperature also if the soldering iron should be left switched on for a long time in the stand.

In order to prevent a strong heat conduction downwards through the side plates 3, 4 to the bottom plate 1, the gables may be provided with apertures or perforations 15 at their lower portions.

The side plates 3, 4 may be provided with inwardly directed flanges 16 which are fastened to the bottom plate 1 by rivets or screws.

The displaceability of the front support 8 is very advantageous. If said support is adjusted to cooperate with the soldering point close to its soldering tip, it is the tip which at first hand will be cooled off. But in this case a rather small heat quantity per unit of time is conducted the support, because the heat conduction path through the whole soldering part is rather long. In this case the soldering point, with exception for its uttermost end, will be kept at a rather high temperature. An advantage in this case is, that the soldering iron always is very ready for soldering. As soon as the soldering iron is removed from the stand the soldering tip will be heated to a high temperature. A disadvantage, is however, that the rear parts of the soldering iron may be too hot and subject to oxidation or damages of other kinds.

If the support 8 is adjusted to cooperate with the soldering point of the soldering iron nearer to the heating element, there is a rather great heat quantity per time unit which will be conducted to the support 8. In that case the whole soldering point (and, to a certain degree, also the heating element) will be kept at a rather low temperature. A disadvantage in that case is, however, that the soldering iron is not very well prepared for soldering. Because the whole soldering point (and to a degree also the heating element) has a low temperature, it will take a rather long time for the soldering tip to become heated to its full temperature, after the soldering iron has been removed from the stand.

Which position of the front support 8 that should be chosen depends on which type of soldering iron that is used and which type of work that should be done.

I claim:

1. A stand for an electrical soldering iron having a frame, said frame comprising rear supporting means, said rear supporting means being arranged to support said soldering iron from beneath when the soldering iron is placed in said stand with its longitudinal axis in a horizontal direction or somewhat inclined to the horizontal direction, said rear supporting means being further arranged to support said soldering iron between its weight centre and its soldering tip, and front supporting means, said front supporting means being arranged to support said soldering iron from above, near its soldering tip, wherein said front supporting means is displaceable in the longitudinal direction of the soldering iron.

2. A stand according to claim 1, wherein said front supporting means has the shape of a rod, which is rotatable about its longitudinal axis, so that different sides of it may be brought into cooperation with the soldering point.

3. A stand according to claim 2, wherein said rod has a rectangular cross section.

4. A stand according to claim 2, wherein said rod has a circular cross section.

5. A stand according to claim 2, wherein said rod has an elliptical cross section.

6. A stand according to claim 1, wherein said front supporting means and said rear supporting means are supported between two side plates and said plates are fastened to a bottom plate, said side plates serving as cooling flanges.

7. A stand according to claim 6, wherein said side plates are provided with apertures at the lower part thereof in order to decrease the heat conduction through said side plates in a downward direction to the bottom plate.

8. A stand according to claim 1, wherein said rear supporting means has the shape of an end plate, which is located substantially at a right angle to the longitudinal axis of the soldering iron, and which is adapted to serve as a heat shield between the heated part and the handle of said soldering iron.

References Cited by the Examiner

UNITED STATES PATENTS

| | | | |
|---|---|---|---|
| 585,641 | 6/1897 | Dupee | 126—236 X |
| 1,789,475 | 1/1931 | Powell | 165—80 |
| 2,355,883 | 8/1944 | Mathews | 165—80 X |
| 3,215,815 | 11/1965 | Lerner | 126—236 X |

FOREIGN PATENTS 769,214   3/1957   Great Britain.

ROBERT A. O'LEARY, *Primary Examiner.*

A. W. DAVIS, *Assistant Examiner.*